US012182686B2

(12) United States Patent
Modha

(10) Patent No.: US 12,182,686 B2
(45) Date of Patent: Dec. 31, 2024

(54) NEURAL HARDWARE ACCELERATOR FOR PARALLEL AND DISTRIBUTED TENSOR COMPUTATIONS

(71) Applicant: INTERNATIONAL BUSINESS MACHINES CORPORATION, Armonk, NY (US)

(72) Inventor: Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 994 days.

(21) Appl. No.: 15/967,482

(22) Filed: Apr. 30, 2018

(65) Prior Publication Data

US 2019/0332925 A1    Oct. 31, 2019

(51) Int. Cl.
  *G06N 3/063* (2023.01)
  *G06N 3/04* (2023.01)
(52) U.S. Cl.
  CPC ............. *G06N 3/063* (2013.01); *G06N 3/04* (2013.01)
(58) Field of Classification Search
  CPC .................................. G06N 3/063; G06N 3/04
  See application file for complete search history.

(56) References Cited

U.S. PATENT DOCUMENTS

| 9,563,840 | B2 | 2/2017 | Krizhevsky et al. |
| 9,582,726 | B2 | 2/2017 | Pan et al. |
| 9,665,799 | B1 | 5/2017 | Munteanu et al. |
| 9,710,265 | B1 | 7/2017 | Temam et al. |
| 9,721,203 | B1 | 8/2017 | Young et al. |
| 9,779,786 | B1 | 10/2017 | Wu et al. |
| 9,836,691 | B1 | 12/2017 | Narayanaswami et al. |
| 2014/0032465 | A1* | 1/2014 | Modha ............... G06F 13/4068 706/27 |
| 2016/0379109 | A1 | 12/2016 | Chung et al. |

(Continued)

FOREIGN PATENT DOCUMENTS

| JP | H05242065 A | 9/1993 |
| JP | 2000/163384 A | 6/2000 |
| WO | 2017031630 A1 | 3/2017 |

OTHER PUBLICATIONS

US 9,846,837 B1, 12/2017, Narayanaswami et al. (withdrawn)

(Continued)

*Primary Examiner* — Alexey Shmatov
*Assistant Examiner* — Robert Bejcek, II
(74) *Attorney, Agent, or Firm* — Erik A. Huestis; Sameer K. Pai; Foley Hoag LLP

(57) ABSTRACT

Networks and encodings therefor are provided that are adapted to provide increased energy efficiency and speed for convolutional operations. In various embodiments, a neural network comprises a plurality of neural cores. Each of the plurality of neural cores comprises a memory. A network interconnects the plurality of neural cores. The memory of each of the plurality of neural cores comprises at least a portion of a weight tensor. The weight tensor comprising a plurality of weights. Each neural core is adapted to retrieve locally or receive a portion of an input image, apply the portion of the weight tensor thereto, and store locally or send a result therefrom via the network to other of the plurality of neural cores.

29 Claims, 7 Drawing Sheets

(56) References Cited

U.S. PATENT DOCUMENTS

| | | | |
|---|---|---|---|
| 2017/0103299 A1 | 4/2017 | Aydonat et al. | |
| 2017/0200094 A1 | 7/2017 | Bruestle et al. | |
| 2017/0300811 A1 | 10/2017 | Merhav et al. | |
| 2017/0316312 A1 | 11/2017 | Goyal et al. | |
| 2018/0018554 A1* | 1/2018 | Young | G06N 3/084 |
| 2018/0046895 A1 | 2/2018 | Xie et al. | |
| 2020/0380370 A1* | 12/2020 | Lie | G06F 17/10 |

OTHER PUBLICATIONS

Novikov et al. Tensorizing Neural Networks. 2015 (Year: 2015).*

Kavvadias, Stamatis. Direct Communication and Synchronization Mechanisms in Chip Multiprocessors. University of Crete Department of Computer Science. 2010. (Year: 2010).*

Kavvadias, Stamatis. Direct Communication and Synchronization Mechanisms in Chip Multiprocessors. 2011 (Year: 2011).*

Anwar, S., Hwang, K., & Sung, W. (2017). Structured pruning of deep convolutional neural networks. ACM Journal on Emerging Technologies in Computing Systems (JETC), 13(3), 32.

Denton, E. L., Zaremba, W., Bruna, J., LeCun, Y., & Fergus, R. (2014). Exploiting linear structure within convolutional networks for efficient evaluation. In Advances in Neural Information Processing Systems (pp. 1269-1277).

Liu, B., Wang, M., Foroosh, H., Tappen, M., & Pensky, M. (2015). Sparse convolutional neural networks. In Proceedings of the IEEE Conference on Computer Vision and Pattern Recognition (pp. 806-814).

Zhang, C., Li, P., Sun, G., Guan, Y., Xiao, B., & Cong, J. (2015, February). Optimizing fpga-based accelerator design for deep convolutional neural networks. In Proceedings of the 2015 ACM/SIGDA International Symposium on Field- Programmable Gate Arrays (pp. 161-170). ACM.

Chen et al., "Eyeriss: A Spatial Architecture for Energy-Efficient Dataflow for Convolutional Neural Networks," ACM/IEEE 43rd Annual International Symposium on Computer Architecture (ISCA) 367-379 (2016).

Esser et al., "Convolutional networks for fast, energy-efficient neuromorphic computing," PNAS 113(41):11441-11446 (2016).

Han et al., "EIE: Efficient Inference Engine on Compressed Deep Neural Network," ACM Sigarch Comp Arch News 44 (3):243-254 (2016).

International Search Report and Written Opinion for International Application No. PCT/EP2019/060888 dated Jul. 19, 2019.

Jouppi et al., "In-Datacenter Performance Analysis of a Tensor Processing Unit," Proceedings of the 44th Annual International Symposium on Computer Architecture, ACM Press, 1-12 (2017).

Markidis et al., "NVIDIA Tensor Core Programmability, Performance & Precision," arxiv.org, Cornell University Library, 1-11 (2018).

Sze et al., "Efficient Processing of Deep Neural Networks: A Tutorial and Survey," arxiv .org, Cornell University Library, 1-32 (2017).

European Examination Report for EP Application No. 19720569.3 dated Jun. 30, 2021.

EP Office Action Response for EP Application No. 19720569 dated Dec. 8, 2021.

Notice of Reasons for Refusal for JP Application No. 2020-557303 dated Jul. 19, 2022.

Summons to Attend Oral Proceedings for EP Application No. 19720569.3 dated Mar. 16, 2023.

* cited by examiner

NEURAL HARDWARE ACCELERATOR FOR PARALLEL AND DISTRIBUTED TENSOR COMPUTATIONS

BACKGROUND

Embodiments of the present disclosure relate to a hardware accelerator for parallel and distributed tensor computations, and more specifically, to neural networks and encodings therefor adapted to provide increased energy efficiency and speed for convolutional operations.

BRIEF SUMMARY

According to embodiments of the present disclosure, neural network systems are provided. The systems comprise a plurality of neural cores. Each of the plurality of neural cores comprises at least one memory. A network interconnects the plurality of neural cores. The memory of each of the plurality of neural cores comprises at least a portion of a weight tensor. The weight tensor comprising a plurality of filters. Each neural core is adapted to retrieve locally or receive a portion of an input data tensor, apply the portion of the weight tensor thereto, and store locally or send a result therefrom via the network to other of the plurality of neural cores.

According to embodiments of the present disclosure, methods of and computer program products for operating a neural network are provided. A portion of an input data tensor is retrieved locally or received at a neural core. The neural core comprises a memory. At least a portion of a weight tensor is read from the memory. The weight tensor comprises a plurality of filters. The portion of the weight tensor is applied to the portion of the input data tensor to obtain a result. The result is stored locally or sent via a network to at least one other neural core.

DETAILED DESCRIPTION

Figure 1:
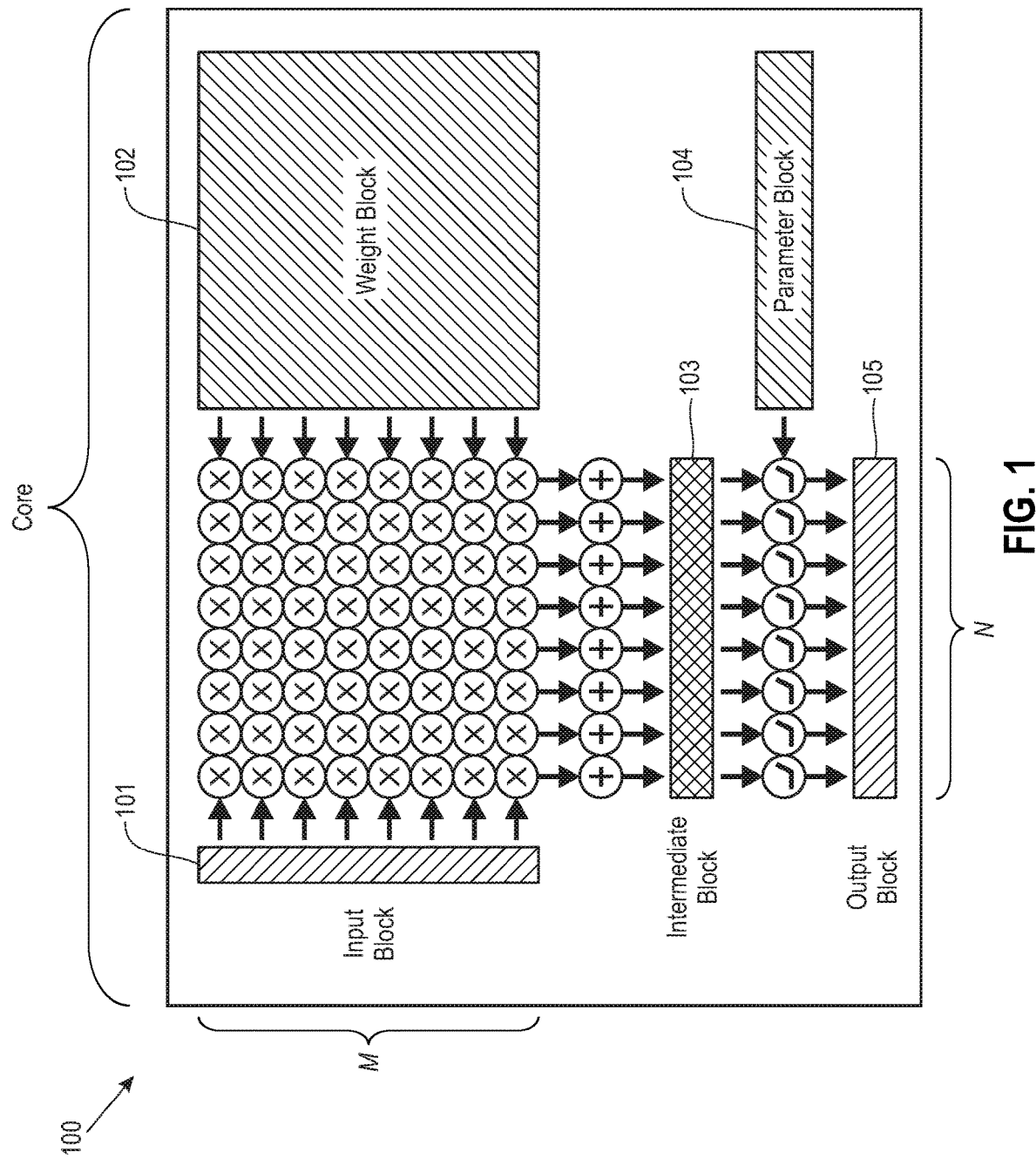
FIG. 1 depicts a neural core according to embodiments of the present disclosure.

In machine learning, a convolutional neural network (CNN) is a class of multi-layer neural networks applicable to, for example, analyzing visual imagery. A CNN consists of an input and an output layer, as well as multiple hidden layers, including at least one layer of artificial neurons that collectively compute a convolution operation.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions $\sigma$ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function $\sigma$.

An element of a layer's output data tensor Y can be computed as in Equation 1 where the neuron activation function $\sigma$ is configured by the vector of activation function parameters $V[i, j, k, :]$, and the weighted sum $Z[i, j, k]$ can be computed as in Equation 2.

$$Y[i, j, k] = \sigma(V[i, j, k, :]; Z[i, j, k]) \qquad \text{Equation 1}$$

-continued $$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function $Y[i, j, k]=\sigma(Z[i, j, k])=Z[i, j, k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

In some embodiments, the output data tensor is partitioned into blocks of the same shape, each computed by a single neural core. In such embodiments, the input data tensor, weight tensor, and parameter tensor are decomposed into blocks of compatible shape such that each output data block is computed by combining the corresponding input data, weight, and parameter blocks, which are received by the neural core responsible for computing the output data block.

In some embodiments, the computation of an output data block may be distributed among multiple neural cores. In such embodiments, each neural core receives one or more input data block and the corresponding weight blocks, and generates intermediate blocks containing their partial sums, which are brought together and summed by a single neural core that also receives the parameter block required to compute the corresponding output data block.

In various embodiments, the neural core array may reside on a single chip. In such embodiments, tensor blocks may be transmitted via an on-chip network. This allows the model to be located closer to the computation, increasing speed and parallelism and decreasing energy usage and memory access.

In some embodiments, the network that communicates tensor blocks between cores may have local connectivity, such that a core only has direct connections to cores in the same neighborhood of the core array. For example, in a 2-dimensional neural core array, each neural core may only be directly connected to the 4 cores immediately adjacent in the vertical and horizontal directions. In such embodiments, tensor blocks may be transmitted to distant cores by relaying them through a chain of directly connected cores, but such indirect communication requires more time and energy than direct communication. Accordingly, it is advantageous to partition a problem in a way that maximizes the ratio of direct to indirect communication when transmitting tensor blocks between cores.

When the network that communicates tensor blocks between cores has local connectivity, and the problem to be computed by the neural core array also has local structure, it is advantageous to partition the tensor such that the resulting tensor blocks may be assigned to cores in a way that aligns the dimensions along which the problem exhibits locality in the tensor, with the dimensions along which the network exhibits locality in the core array. For example, in a 2-dimensional neural core array, an on-chip network with nearest-neighbor connectivity exhibits locality along the row and column dimensions of the neural core array. If each element of an output data tensor only receives connections from a small spatial neighborhood of the corresponding location in the input data tensor, then the output data tensor exhibits locality along the row and column dimensions of the input data tensor. In such a case, the output data tensor should be partitioned along its row and column dimensions, and the resulting blocks distributed along the row and column dimensions of the neural core array. A spatial convolution layer is one example of such an output data tensor.

Figure 2:
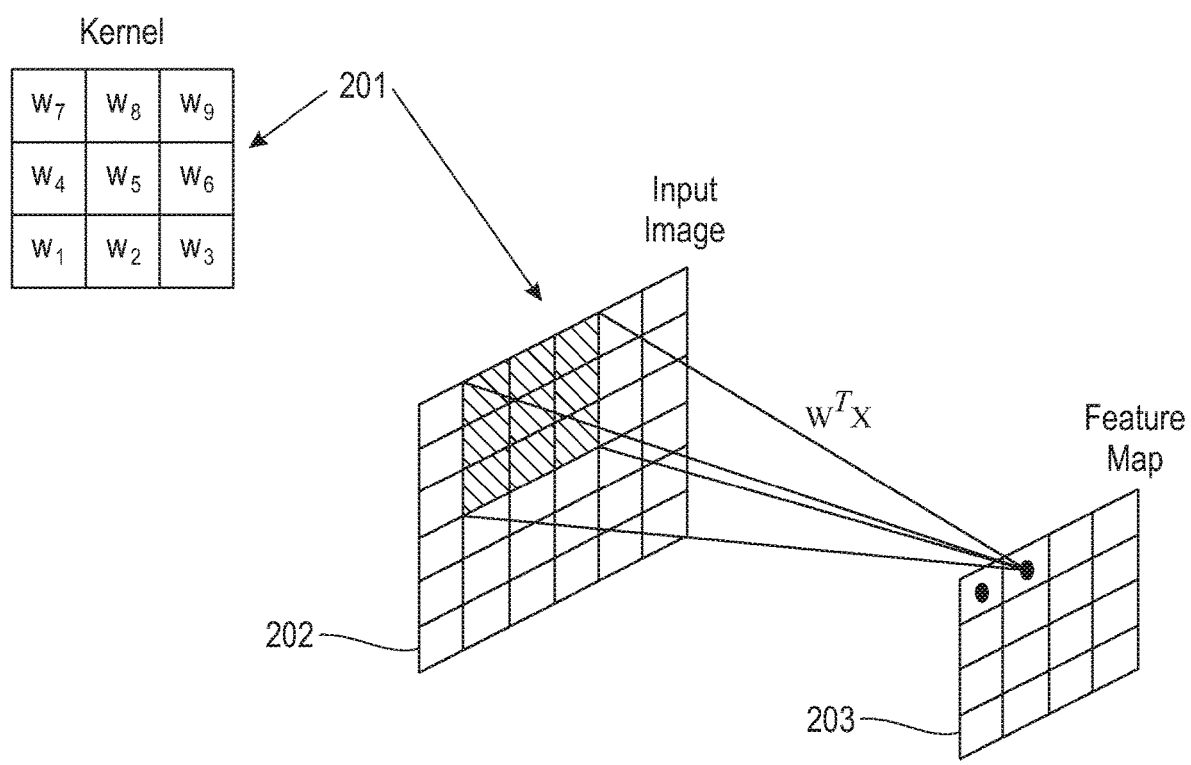
FIG. 2 illustrates a convolution operation according to embodiments of the present disclosure.

Referring to FIG. 2, an exemplary convolution is illustrated. Filter 201 comprises a plurality of weights $w_1 \ldots w_9$. It will be appreciated that the sizes provided here are merely exemplary, and that any filter dimension may be used as described herein. Filter 201 is applied to each tile of image 202. In this example, two sequential 3×3 tiles are illustrated. The result of each tile is an element of feature map 203. The result of the first sequential tile is indicated by a first dot on the feature map. The result of the second sequential tile is indicated by lines terminating in a second dot. It will be appreciated that a plurality of filters may be applied to the same image in order to generate multiple feature maps.

A convolution layer exploits spatially local correlations in natural sensor data by enforcing a local connectivity pattern between neurons in adjacent layers: each neuron receives connections from only a small region of the input data tensor. The extent of this connectivity is called the receptive field of the neuron. All neurons that compute elements of the same output feature share the same set of weights and activation function parameters, called a filter, with a local receptive field. The size of a filter is fixed, irrespective of input size, so a convolution layer has far fewer free parameters than a fully connected layer with the same input and output dimensions, and a correspondingly smaller memory footprint.

For example, in a spatial convolution layer, each filter's receptive field covers only a fraction of the height and width of the input data tensor, but extends through the full feature depth. Such an architecture ensures that the filters produce the strongest response to a spatially local input pattern. The layer computes its output by convolving each filter across the width and height of the input data tensor, computing the dot product between the entries of the filter and the input data at each location to produce a 2-dimensional activation map for each filter.

Stacking the feature maps for all filters forms the full output volume for the convolution layer. Every entry in the output data tensor can thus also be interpreted as an output of a neuron that looks at a small region in the input and shares filter parameters with neurons in the same output feature map.

It will be appreciated that the size of a convolution layer's output data tensor is a function of the size of the input data tensor, the size of the filters, and the stride with which the filters are applied to the input data tensor. The stride parameters stride_a, stride_b, and stride_c define the distance between each filter application, a value of 1 signifying that each filter application is shifted one pixel along the relevant dimension of the input data tensor. Larger stride values reduce the computational load by computing only a subset of the possible output pixels.

It will further be appreciated that in various convolutions, zero padding may be applied to the input image in order to vary the output image size relative to the input size, for example to make those sizes equal. Image padding may be omitted in various examples for simplicity of explanation, but it will be apparent that padding may be included in various embodiments without departing from the scope of the present disclosure.

In a convolution layer, the 6-dimensional weight tensor contains many repeated blocks, since all elements of the same output feature share the same filter weights that are replicated at each output location. The shared filter weights can be described more compactly by a dense 4-dimensional filter tensor F that contains all of the filters that compute output features of the layer, and is indexed by the output feature dimension (output feature k) and 3 filter input dimensions (filter row r, filter column s, filter feature t).

$$Z[i, j, k] = \sum_{r=1}^{R} \sum_{s=1}^{S} \sum_{t=1}^{T} F[k, r, s, t] \cdot X[\alpha(i, r; A), \beta(j, s; B), \gamma(r, t; \Gamma)]$$

Equation 3

In Equation 3, the range of the r, s, t summations may be reduced for i, j, k coordinates near the edges of the output data tensor to accommodate boundary conditions, which are omitted here for simplicity. The accessor function $\alpha(i, r; A)$ computes the row coordinate a of the input data element to be multiplied by filter weight $F[k, r, s, t]$ in order to compute output data element $Y[i, j, k]$, where A is a set of constants that parameterize the row coordinate calculation, such as striding parameter stride_a and padding parameter pad_a. Analogous accessor functions $\beta(j, s; B)$ and $\gamma(r, t; \Gamma)$ compute the column and feature coordinates b and c.

The parameters of an exemplary convolution are given below in Table 1.

TABLE 1

| | |
|---|---|
| A | Number of input rows (Height of input data tensor) |
| B | Number of input columns (Width of input data tensor) |

TABLE 1-continued

| | |
|---|---|
| C | Number of input features (Depth of input data tensor) |
| I | Number of output rows (Height of output data tensor) |
| J | Number of output columns (Width of output data tensor) |
| K | Number of output features (depth of output data tensor) |
| R | Number of filter input rows (Height of filter) |
| S | Number of filter input columns (Width of filter) |
| T | Number of filter input features (depth of filter) |
| stride_a | Vertical stride |
| stride_b | Horizontal stride |
| stride_c | Feature stride |
| pad_a | Height of zero-padding |
| pad_b | Width of zero-padding |
| pad_c | Depth of zero-padding |

As described further below, the computations necessary to implement a convolutional layer may be performed in parallel, for example in one or more neuromorphic cores or in a conventional multicore (von Neumann architecture) CPU. This parallelism allows higher capacity networks operating on larger datasets.

In various embodiments, convolution as described above is decomposed into smaller problems. Each problem may then be solved on one or more neuromorphic core or on one or more core of a conventional multicore system in parallel.

In some embodiments, the input data tensor is decomposed along its row and column dimensions into blocks that extend the entire length of its feature dimension. In such embodiments, a neural core receives an input data block and the whole filter tensor F. To correctly compute convolutions for pixels at boundaries of the input data blocks, input data blocks may be generated such that they overlap. Alternatively, partial sums from multiple neural cores may be summed together to arrive at a final result.

Figure 3:
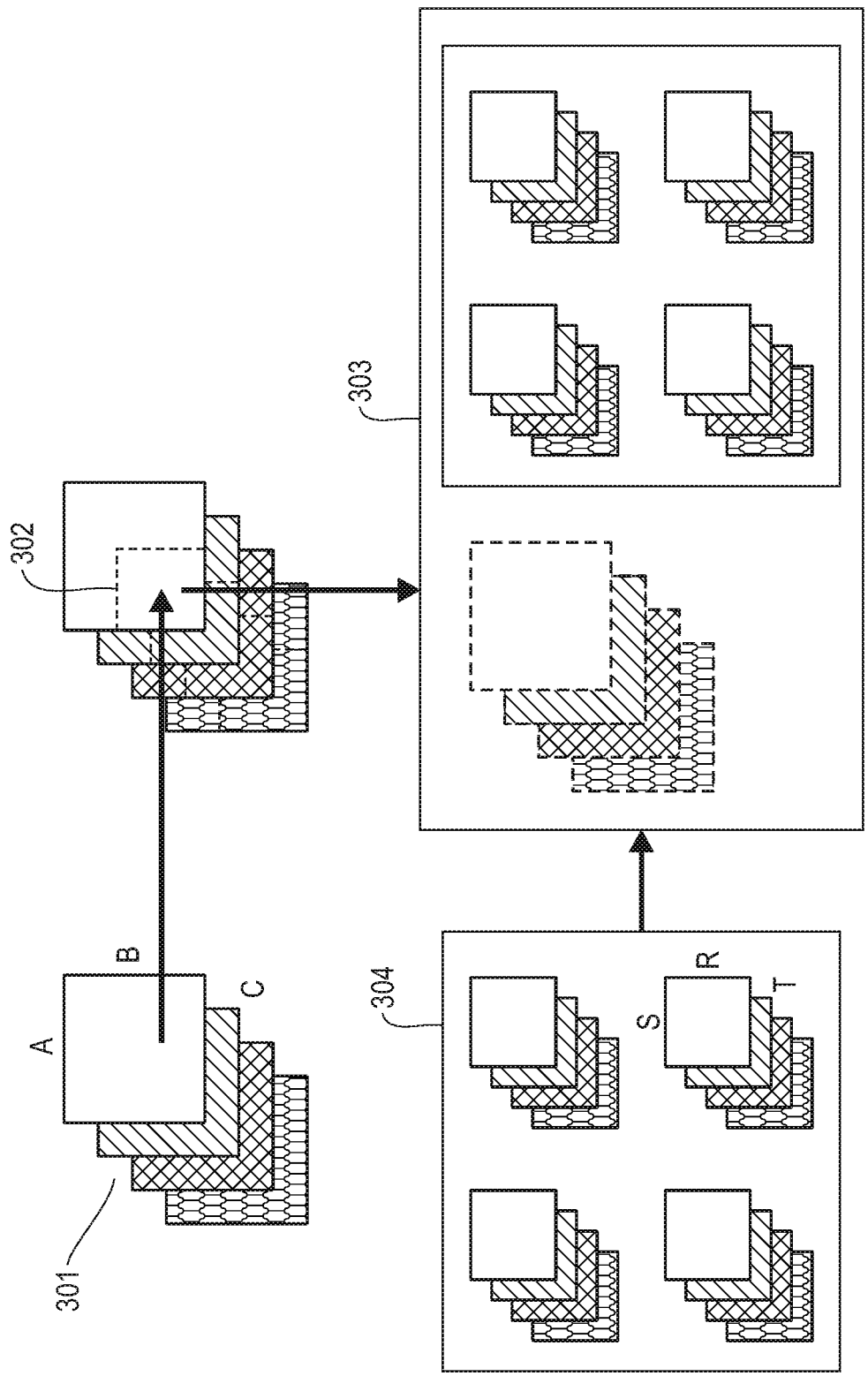
FIG. 3 illustrates a first distribution of a weight tensor and input data to a compute core according to embodiments of the present disclosure.

An example of the above embodiment is illustrated in FIG. 3. Input data 301 includes C input feature maps (or images) having dimension A×B. Data 301 are divided into blocks 302. Input data blocks 302 are provided to neural core 303 along with weight tensor 304.

In some embodiments, the input data tensor is decomposed into blocks along its row, column, and feature dimensions, and the filter tensor is similarly decomposed into blocks along its input feature dimension. In such embodiments, a neural core receives an input data block and corresponding filter block. In some embodiments, input data blocks corresponding to the same input row and input column but different input features are distributed to different neural cores that compute the corresponding partial sums, which are subsequently brought together and summed. In some embodiments, the number of output features is multiplied by the number of blocks along the input feature dimension. In such embodiments, the adjusted number of output features is taken into account during training.

Figure 4:
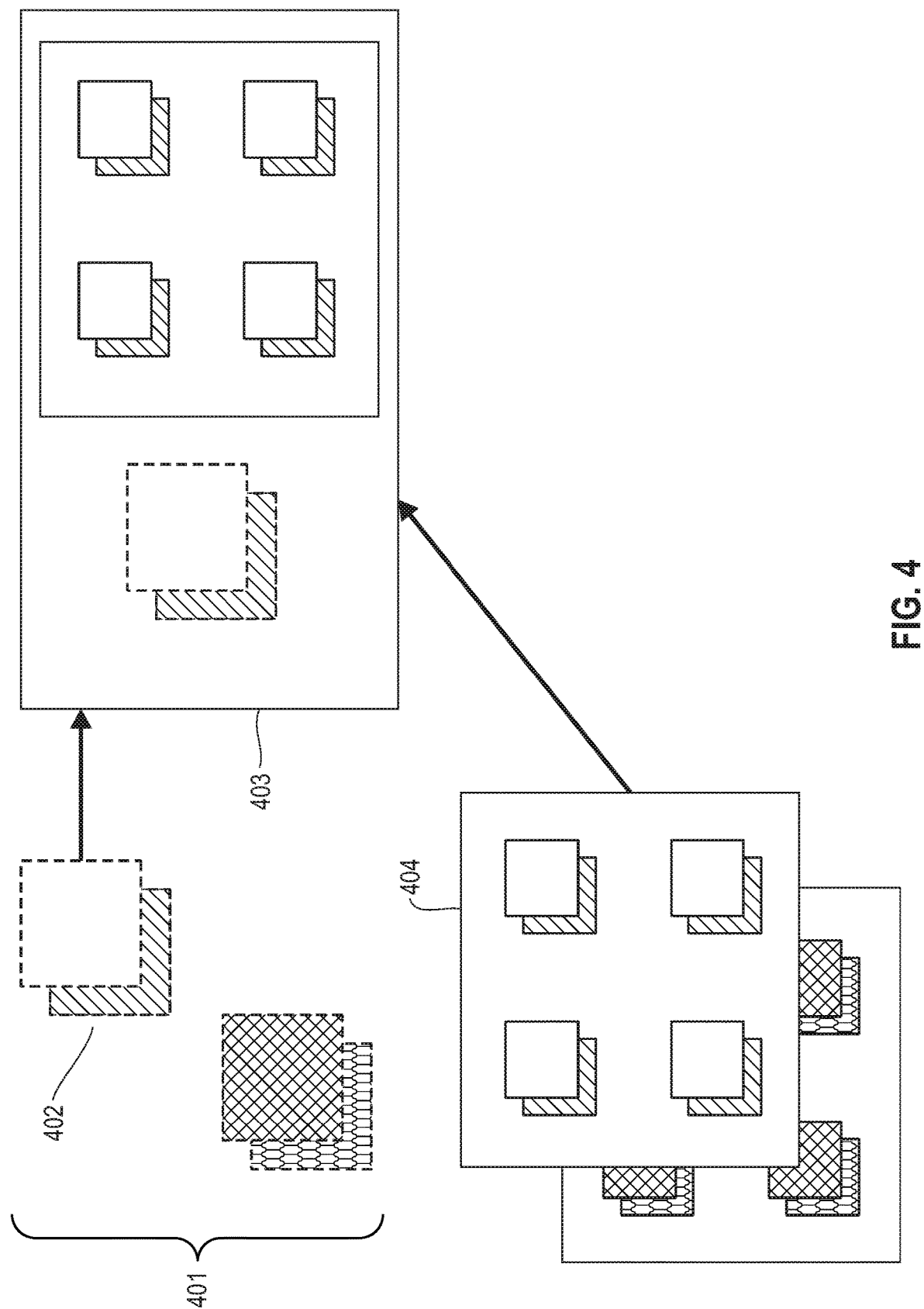
FIG. 4 illustrates a second distribution of a weight tensor and input data to a compute core according to embodiments of the present disclosure.

Another exemplary embodiment is illustrated in FIG. 4. Input data 401 are divided into blocks 402. Data block 402 is provided to neural core 403 along with a corresponding portion 404 of the filter tensor.

In some embodiments, the weight tensor is further decomposed into blocks along its output feature dimension. Each output feature block of the filter tensor is sent to a different neural core, so each block of the input tensor is sent to as many neural cores as there are output feature blocks.

Figure 5:
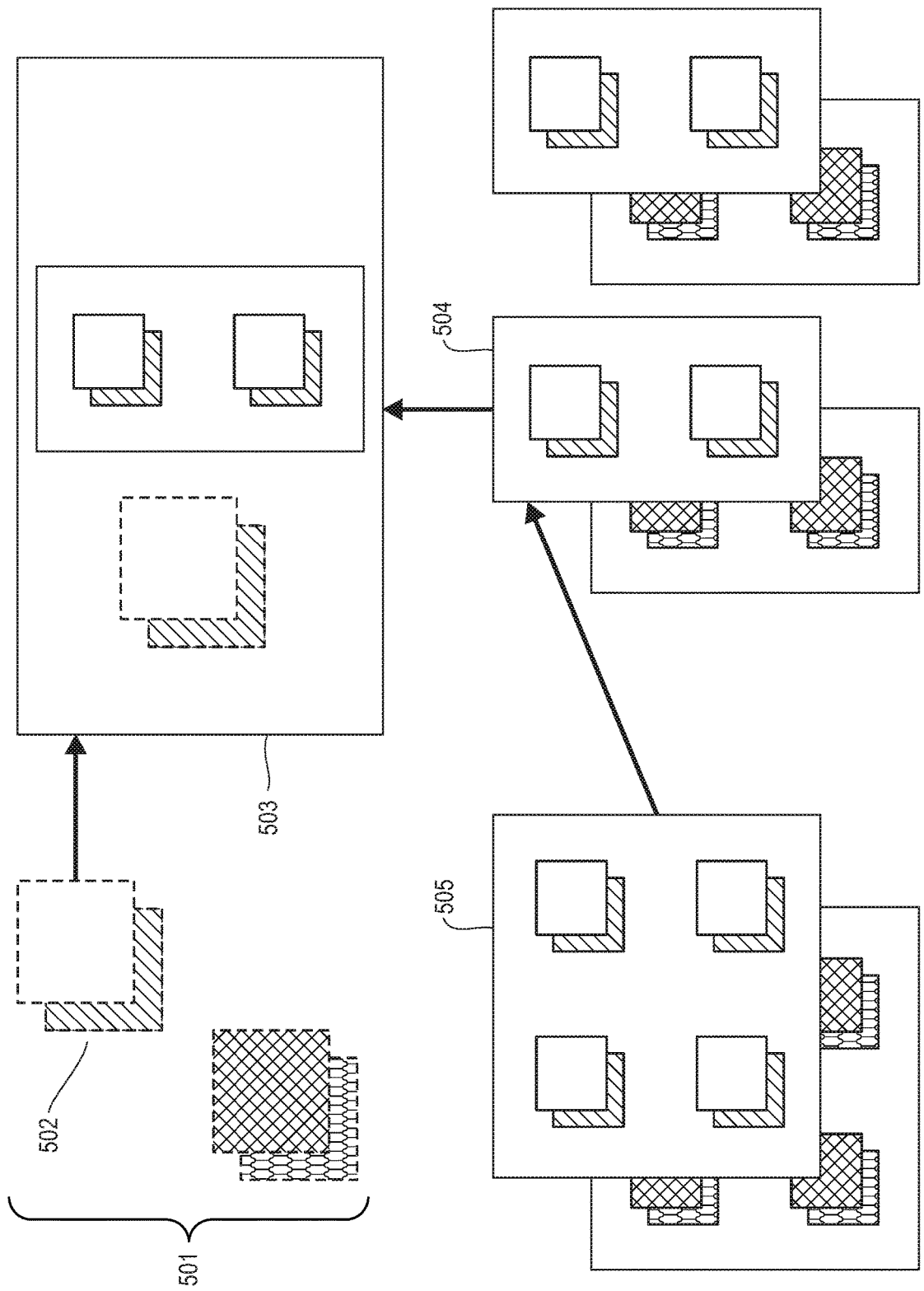
FIG. 5 illustrates a third distribution of a weight tensor and input data to a compute core according to embodiments of the present disclosure.

Another exemplary embodiment is illustrated in FIG. 5. Input data 501 are divided into blocks 502. Data block 502 is provided to compute core 503 along with a corresponding portion 404 of the filter tensor 405.

A convolution layer is an example of a sparse weight tensor. A tensor is sparse if it contains mainly zero values, and dense if it contains mainly non-zero values. By storing only the non-zero values, a sparse tensor can be compressed to use much less memory than a dense tensor with the same shape. Similarly, by skipping zero values, multiplication with a sparse tensor can use many fewer operations and thereby less energy than multiplication with a dense tensor.

A convolution layer is also an example of a block-sparse weight tensor, due to its local connectivity. A sparse tensor is block-sparse if all of its non-zero values are concentrated in blocks. A tensor exhibits locality along a given dimension if it is block-sparse along that dimension. A tensor may be sparse or block-sparse along some dimensions and dense along other dimensions. For example, the weight tensor of a spatial convolution layer is block-sparse along the input row and input column dimensions, and dense along the input feature, output row, output column, and output feature dimensions.

A fully connected layer is an example of a weight tensor that is typically dense. In a fully connected layer, every element of the 3-dimensional input data tensor is connected to every element of the 3-dimensional output data tensor. Each connection may have a different non-zero weight, and each activation function may have different parameters. Therefore, both the 6-dimensional weight tensor and 4-dimensional parameter tensor are dense along all dimensions, and the entire volume of both tensors must be stored in the memory of any system that implements the fully connected layer.

For a single image, X denotes the input tensor having dimension A×B×C. The filter tensor F denotes the set of convolution filters and has dimension K×R×S×T. The output tensor Z has dimension I×J×K. In various embodiments, each element in the data tensors are of fixed size, for example 4 bits. In various embodiments, each element in the filter tensor is selected from a finite set, for example {−1,0, +1}.

For K filter kernels of size R×S×T, each input pixel is used K×R×S times. For an input data tensor of size A×B×C, each filter weight is used (A−R+1)×(B−S+1) times, as many times as there are output pixels.

Input X may be represented as a column vector of length A×B×C. Filters F may be represented as a matrix having A×B×C rows and K×A×B columns. The number of columns corresponds to the number of filters multiplied by the number of pixels in the input image. Accordingly, an output row vector with K×A×B columns may be obtained as $Y^T = X^T \times F$.

It will be appreciated that the above formulation results in sparse matrix multiplication. In particular, each column of F has at most R×S×T non-zero entries. Each row of F has at most K×R×S non-zero entries.

It will be appreciated that the sparse nature of F allows various optimizations in its storage and use. For example, F may be stored such that the first index in a row or column is absolute, while subsequent indices are relative.

In various embodiments, different representations of filter tensor F are used.

In one such exemplary representation, for each non-zero value in a filter input column, the filter input row and element value are stored instead of storing the entire matrix. In such embodiments, to compute entry j in output $Z^T$, column j of F is considered. Within the column, for each stored row index $m \in [0 \ldots i]$, entry m in $X^T$ is looked up, and the scalar is accumulated as in Equation 4.

$$[Y^T]_j \mathrel{+}= [X^T]_m \times F(m,j) \qquad \text{Equation 4}$$

In some embodiments, the maximum number of non-zero values per column is limited to R×S×T. This corresponds to the maximum receptive field for the filter.

As described above, for each column in F, all non-zero values are read. In some embodiments using neural cores, the input data value is read in parallel with the weight value. Inputs with a zero value are ignored to exploit the sparsity of F. The product of each input with the corresponding weight is added to the partial sum as per Equation 4, above. In some embodiments, the addition is performed in parallel.

In another exemplary representation, for each non-zero value in a row, the column index and value are stored instead of storing the entire matrix. In such embodiments, to compute output $Y^T$, row i of F is considered. For each stored row index $m \in [0 \ldots j]$, entry m in $X^T$ is looked up, and the scalar is accumulated as in Equation 5.

$$[Y^T]_m \mathrel{+}= [X^T]_i \times F(i,m) \qquad \text{Equation 5}$$

In some embodiments, the maximum number of non-zero values per row is limited to K×R×S. This corresponds to the maximum possible degree of parallelism.

For each row in F, all non-zero values are read in parallel. In some embodiments using neural cores, the input data value is read in parallel with the weight value. Inputs with a zero value are ignored to exploit the sparsity of F. The product of each input with the corresponding weight is added to the partial sum as per Equation 5, above. In some embodiments, the addition is performed in parallel. In some embodiments, the partial sum is stored back to a memory. This storage step allows reuse of the circuit for arbitrary further neurons at the expense of energy use.

In the above embodiments, each input data value is read once, and then split for downstream processing. By going through inputs in a systematic manner, the need for repeatedly reading and writing data memory is minimized. Although partial sums are loaded repeatedly, input data sparsity need only be checked once.

In the above example, the sparsity of F may be leveraged by clustering rows such that no two rows in a cluster have the same neuron as their target. In some embodiments, each row targets as many neurons as possible. In any case, each row may have a different axon firing value. This representation allows all neuron states to be read together.

In another exemplary representation, for each non-zero value in F the row and column indices and correspond value are stored instead of storing the entire matrix. In such embodiments, to compute output $Y^T$, row i and column j of F is considered. For each stored index entry, and the scalar is accumulated as in Equation 6.

$$[Y^T]_j \mathrel{+}= [X^T]_i \times F(i,j) \qquad \text{Equation 6}$$

Figure 6:
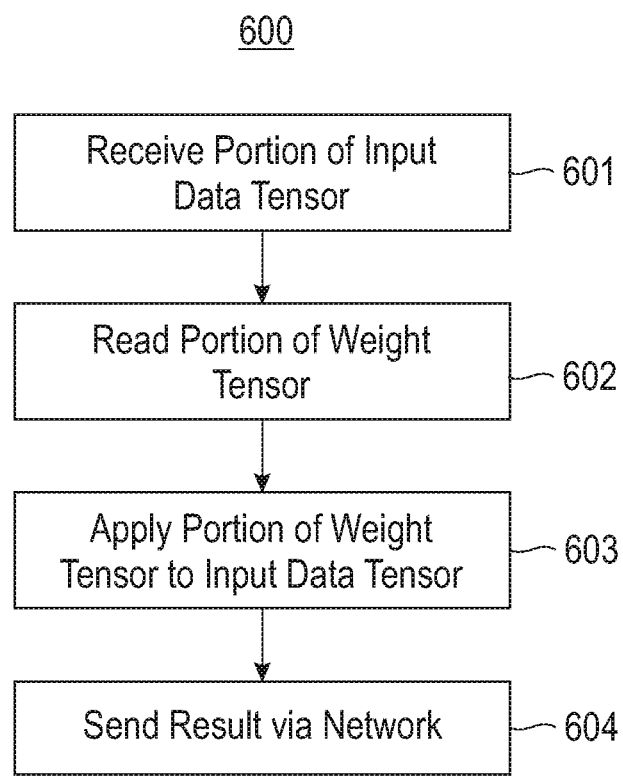
FIG. 6 illustrates a method for operating a neural network according to embodiments of the present disclosure.

With reference now to FIG. 6, a method of operating a neural network is illustrated according to embodiments of the present disclosure. At 601, a portion of an input data tensor is received at a neural core. The neural core comprises a memory. At 602, at least a portion of a weight tensor is read from the memory. The weight tensor comprises a plurality of filters. At 603, the portion of the weight tensor is applied to the portion of the input data tensor to obtain a result. At 604, the result is sent via a network to at least one other neural core.

16. The system of claim 5, where weight tensor blocks are replicated for multiple neural cores.

18. #16, where the weight tensor block is stored in only a single neural core memory, and distributed to multiple neural cores via a network-on-chip.

19. #16, where the weight tensor block is stored in only a single memory that is external to the core array, and distributed to multiple neural cores via a network-on-chip.

Figure 7:
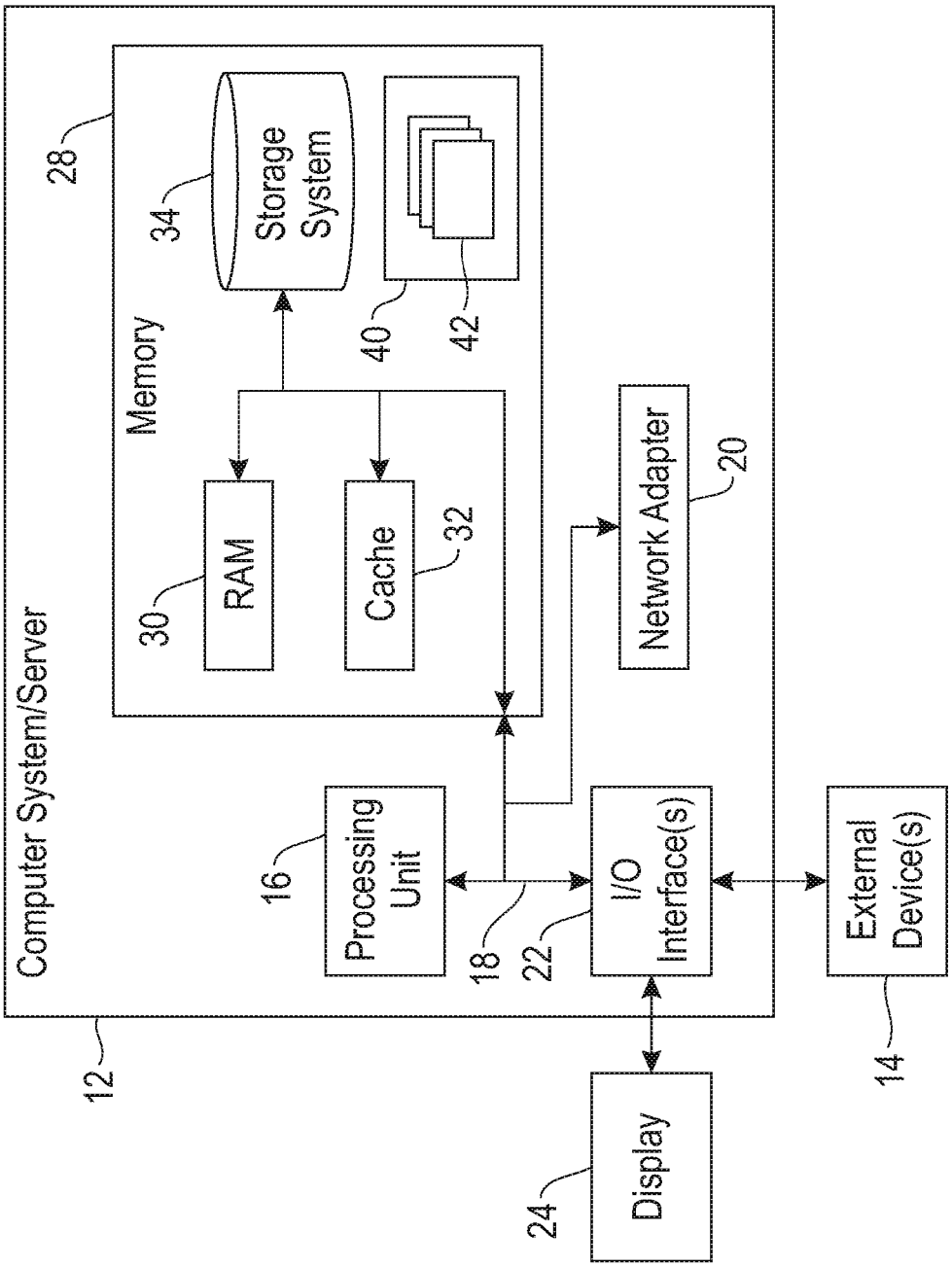
FIG. 7 depicts a computing node according to an embodiment of the present disclosure.

Referring now to FIG. 7, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In various embodiments, one or more neural core (not pictured) is coupled to bus 18. In such embodiments, a neural core may receive data from or write data to memory 28 via bus 18. Likewise, a neural core may interact with other components via bus 18 as described herein. In various embodiments, a neural core may include one or more local controller, memory, or clock, for example as set forth elsewhere herein.

The present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a plurality of neural cores, each of the plurality of neural cores comprising at least one memory, wherein the plurality if neural cores is arranged in a two-dimensional array, and wherein each of the plurality of neural cores includes direct connections and relay connections with other of the plurality of neural cores; and a network interconnecting the plurality of neural cores, wherein:

the at least one memory of each of the plurality of neural cores comprises at least a portion of a weight tensor, the weight tensor comprising a plurality of filters, each neural core is adapted to retrieve locally or receive a portion of an input data tensor, apply the portion of the weight tensor thereto, and store locally or send a result therefrom via the network to other of the plurality of neural cores, the weight tensor is distributed among the plurality of neural cores according to physical dimensions of the two-dimensional array and based on a locality of the weight tensor and the direct connections of each of the plurality of neural cores, wherein the distribution of the weight tensor is according to a ratio of a number of the direct connections to a number of the relay connections, wherein the ratio is maximized for the direct connections to the relay connections when transmitting the weight tensor between the plurality of neural cores, and the dimensions, shape, and partitioning of the weight tensor are configurable.

2. The system of claim 1, wherein applying the portion of the weight tensor to the portion of the input data tensor comprises computing a vector-matrix multiplication followed by an activation function.

3. The system of claim 1, wherein the network provides local connectivity among the plurality of neural cores.

4. The system of claim 1, wherein the network provides connectivity among neighboring neural cores within the array.

5. The system of claim 1, wherein the portion of the weight tensor at each of the plurality of neural cores comprises a block of the weight tensor.

6. The system of claim 1, wherein the weight tensor is partitioned along one or more dimensions exhibiting locality.

7. The system of claim 6, wherein the one or more dimensions comprise spatial dimensions.

8. The system of claim 6, wherein the one or more dimensions comprise at least one feature dimension.

9. The system of claim 1, wherein the weight tensor is sparse.

10. The system of claim 9, wherein during said applying the portion of the weight tensor to the portion of the input data tensor, only non-zero values of the weight tensor are used for computation.

11. The system of claim 9, wherein the memory stores only non-zero values of the weight tensor.

12. The system of claim 1, wherein the weight tensor corresponds to a convolution filter.

13. The system of claim 12, wherein the weight tensor is partitioned along one or more spatial dimension.

14. The system of claim 1, wherein the result is an intermediate result, and wherein:

each neural core is further adapted to store locally or send the intermediate result via the network to other of the plurality of neural cores;

each neural core is further adapted to retrieve locally or receive the intermediate result and compute a final result therefrom.

15. The system of claim 1, wherein the portion of the weight tensor at each of the plurality of neural cores comprises a block of the weight tensor, and wherein a subset of the plurality of neural cores include the same replicated block.

16. The system of claim 1, wherein one of the plurality of neural cores includes the whole weight tensor.

17. The system of claim 16, wherein the one neural core is adapted to distribute the portions of the weight tensor to each other of the plurality of neural cores.

18. The system of claim 1, further comprising:

a central memory comprising the whole weight tensor, wherein the system is adapted to distribute the portions of the weight tensor to each other of the plurality of neural cores from the central memory.

19. The system of claim 1, wherein the portion of the weight tensor corresponds to a subset of the plurality of filters.

20. The system of claim 1, wherein the weight tensor is compressed.

21. The system of claim 1, wherein the weight tensor is encoded to exclude zero values.

22. The system of claim 1, wherein each value of the weight tensor is −1, 0, or 1.

23. A method comprising:

retrieving locally or receiving a portion of an input data tensor at a neural core of a plurality of neural cores, the neural core comprising a memory, the plurality of neural cores being arranged in a two-dimensional array, and the plurality of neural cores including direct connections and relay connections with other of the plurality of neural cores;

reading from the memory at least a portion of a weight tensor, the weight tensor comprising a plurality of filters, the weight tensor being distributed among the plurality or neural cores according to physical dimensions of the two-dimensional array and based on a locality of the weight tensor and the direct connections of each of the plurality of neural cores, and the dimensions, shape, and partitioning of the weight tensor being configurable, wherein the distribution of the weight tensor is according to a ratio of a number of the direct connections to a number of the relay connections;

wherein the ratio is maximized for the direct connections to the relay connections when transmitting the weight tensor between the plurality of neural cores;

applying the portion of the weight tensor to the portion of the input data tensor to obtain a result;

storing locally or sending the result via a network to at least one other neural core.

24. The method of claim 23, wherein the weight tensor is sparse.

25. The method of claim 23, wherein the portion of the weight tensor corresponds to a subset of the plurality of filters.

26. The method of claim 23, wherein the weight tensor is compressed.

27. The method of claim 23, wherein the weight tensor is encoded to exclude zero values.

28. The method of claim 23, wherein each value of the weight tensor is −1, 0, or 1.

29. A system comprising:

a plurality of neural cores, each of the plurality of neural cores comprising a memory, wherein the plurality of neural cores is arranged in a two-dimensional array, and wherein each of the plurality of neural cores includes direct connections and relay connections with other of the plurality of neural cores;
a network interconnecting the plurality of neural cores;
a computing node comprising a computer readable storage medium having program instructions embodied therewith, the program instructions executable by a processor of the computing node to cause the processor to perform a method comprising:
  encoding a plurality of filters in a weight tensor; and
  providing at least a portion of the weight tensor to each of the plurality of neural cores,
  wherein the weight tensor is distributed among the plurality of neural cores according to physical dimensions of the two-dimensional array and based on a locality of the weight tensor and the direct connections of each of the plurality of neural cores, and the dimensions, shape, and partitioning of the weight tensor are configurable, wherein the
distribution of the weight tensor is according to a ratio of a number of the direct connections to a number of the relay connections,
wherein the ratio is maximized for the direct connections to the relay connections when transmitting the weight tensor between the plurality of neural cores, and
wherein each of the plurality of neural cores is adapted to:
  store in its memory at least a portion of the weight tensor;
  retrieve locally or receive a portion of an input data tensor;
  apply the portion of the weight tensor to the portion of the input data tensor to obtain a result; and
  store locally or send the result via a network to at least one other neural core.

* * * * *